United States Patent [19]
Kelly

[11] 3,723,968
[45] Mar. 27, 1973

[54] PARKING BRAKE ALARM

[76] Inventor: Wilfred J. Kelly, 84 Pavilion Ave., Providence, R.I.

[22] Filed: June 18, 1970

[21] Appl. No.: 48,925

Related U.S. Application Data

[63] Continuation of Ser. No. 650,715, July 3, 1967, abandoned.

[52] U.S. Cl.................340/69, 340/52 D, 340/384 R
[51] Int. Cl...........................B60q 5/00, B60t 17/22
[58] Field of Search.............................340/52 D, 69

[56] References Cited

UNITED STATES PATENTS

| | | |
|---|---|---|
| 2,692,960 | 10/1954 | Keegin...............................340/69 X |
| 2,724,101 | 11/1955 | Hallman............................340/69 X |
| 2,740,947 | 4/1956 | Davies...............................340/69 X |
| 2,773,249 | 12/1956 | De Santis..........................340/69 X |
| 2,960,680 | 11/1960 | Lea.......................................340/70 |
| 3,005,187 | 10/1961 | Passa..................................340/52 D |

Primary Examiner—Kenneth N. Leimer
Attorney—Frank M. Murphy

[57] ABSTRACT

An alarm effective to indicate that a vehicle parking brake is off when the driver moves from the driving position, if at that time, the parking brake is not on. A pressure sensitive means, mounted for example in the base of the driver's seat, is operatively connected to an alarm so that a signal is issued by the alarm upon movement from the driving position, with the proviso that means are provided for making the alarm insensitive to such movement if the parking brake is on. The alarm is an auxiliary electrical circuit connected in parallel with the ignition system. A switch is provided for selectively and simultaneously opening and closing the vehicle electrical system and the auxiliary circuit, so that the auxiliary circuit can be deenergized, and, if deenergized, the ignition system is deenergized and remains deenergized until the alarm system is activated by closing of the switch.

1 Claim, 3 Drawing Figures

Patented March 27, 1973 3,723,968

INVENTOR
WILFRED J. KELLY
BY
Frank M. Murphy
ATTORNEY.

PARKING BRAKE ALARM

This application is a continuation of Ser. No. 650,715, filed July 3, 1967, now abandoned.

BACKGROUND

Numerous devices have been proposed for indicating the position, on or off, of an automobile parking brake. The instant invention is concerned with indicating that the parking brake is in the off position when it should have been placed in the on position. Former proposals include those of U.S. Pat. Nos. 2,742,101 and 2,773,249. These proposed systems have the disadvantage that the warning is given only when the engine is stopped. On many occasions, however, it is desired to leave the engine running under such circumstances that the parking brake should be in the on position. Examples include situations where it is desired to leave the motor running during absence from the car for a short time as where the driver wishes to leave the car while the engine is "warming up", to clean the windshield, or remove snow. Often, when stopped at a red light, the driver may wish to leave the motor running and step out to clear the windshield, check a tire, etc. Another circumstance is where the driver wishes to leave the engine running when making a delivery. A characterizing feature of the invention is that in circumstances such as those mentioned, should the brake be left off, an alarm will be given. For this purpose a weight responsive means such as an automobile seat switch (as disclosed, for example, in U.S. Pat. Nos. 2,794,089 and 3,005,187) is employed so that whenever the driver leaves the driving position, whether the engine is running or not, if the brake is off, an alarm will be sounded.

SUMMARY OF THE INVENTION

According to the invention, a vehicle parking brake alarm indicates when the parking brake is off, upon movement by the driver from the driving position. The system includes weight responsive means responsive to movement of the driver to and from the driving position. This means can be a seat switch, preferably disposed in the base of the seat, though it could be disposed in the back of the seat. In the case of vehicles such as certain delivery trucks and certain mail trucks, in which there is no driver's seat and the driver stands during driving, the weight responsive means could be disposed in the floor portion of the vehicle on which the driver stands during driving. The system further includes alarm means operatively connected to the weight responsive means for actuation of the alarm means upon movement of the driver from the driving position. The alarm means can be, for example, a horn or other device for issuing an audible signal. In a preferred embodiment, the alarm means is also operatively connected to the weight responsive means for deactivation of the alarm means upon movement of the driver to the driving position. Thus, the system would be inoperative during the time when the driver is in the driving position. Another element of the alarm system is an interrupt means, responsive to movement of the brake to the off and to the on position, and effective to make the alarm means inoperative when the brake is in the on position, and to make the alarm means operative when the brake is in the off position. At any time when the brake is off, the alarm means is rendered operative by the interrupt means, so that upon movement of the driver from the driving position, the weight responsive means functions to actuate the alarm means, so that the alarm is given.

In one embodiment of the invention, there is included a disconnect means for selectively disconnecting the alarm means from the weight responsive means, so that the alarm means is made inoperative when the brake is in the off position. Thus, means are provided for rendering the alarm system of the invention inoperative in respect to its usual purpose of indicating if the parking brake is in the off position, upon departure of the driver from the driving position. In some circumstances, it may be desired to have the parking brake in the off position, though the driver is not in the driving position. For example, in the case of washing cars in some types of car washers, the washing system involves moving the car over a path with no one in the car. In such circumstances it would be desired to leave the car and to leave the parking brake in the off position.

For vehicles having electrical circuits as are common in the conventional automobiles, the alarm system can comprise an electrically operated alarm means and an auxiliary circuit operatively connected with the vehicle circuit. Desirably, the disconnect means is such that upon actuation thereof, the auxiliary circuit is opened, to inactivate the alarm system, and simultaneously the vehicle circuit is opened. The opening of the vehicle circuit will render the ignition system inoperative, so that in order to render the vehicle operative, the disconnect means must be operated to close the vehicle circuit. This will simultaneously close the auxiliary circuit. This arrangement insures against the possibility that a driver would disconnect the auxiliary circuit, rendering the alarm system inoperative, and would thereafter forget to connect the alarm system before driving the vehicle.

BRIEF DESCRIPTION OF THE DRAWINGS

Embodiments of the invention are depicted in the accompanying drawing, wherein.

In the drawings, like reference characters indicate corresponding parts.

DESCRIPTION OF THE EMBODIMENTS OF THE DRAWING

Figure 1:
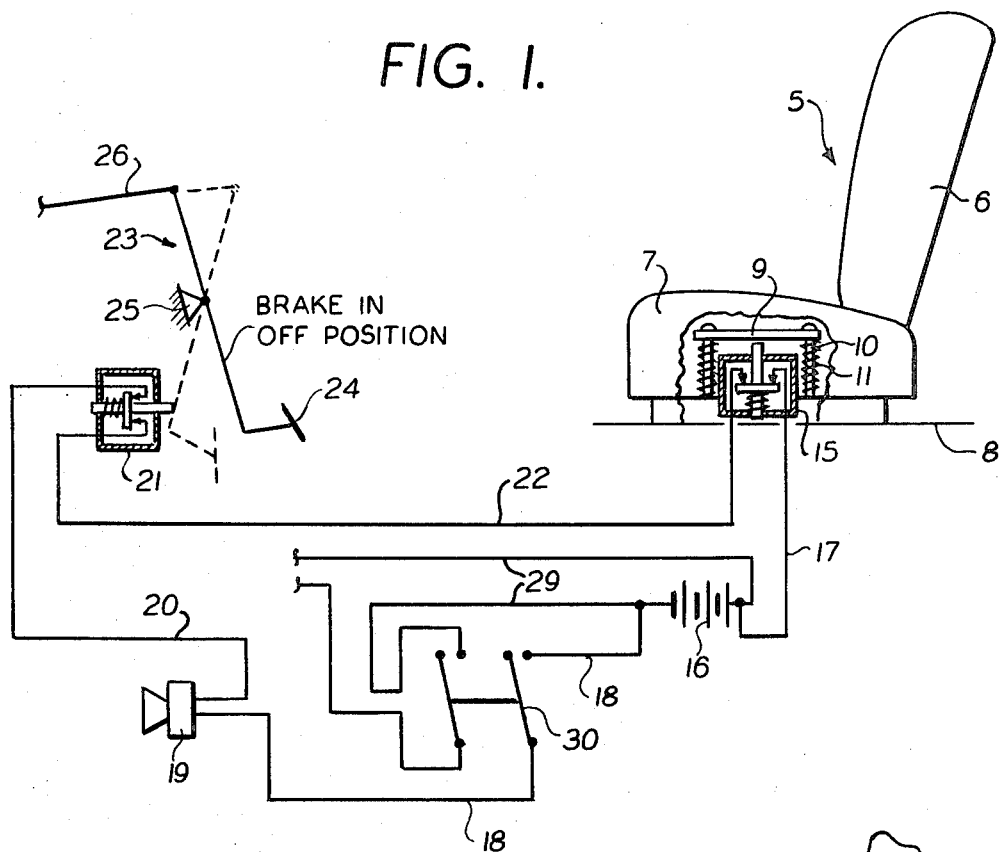
FIG. 1 is a schematic drawing for a parking brake alarm system of the invention, and wherein the system is electrical.

Referring to FIG. 1, a seat 5 having a back rest 6 and a base portion 7 is mounted on the chassis 8 of an automobile. Included in the base portion of the seat is a weight responsive plate 9 movable up and down along the support studs 10, and urged upwardly by the springs 11. The plate 9 will move up and down in response to the weight of a driver taking the driving position or moving from the driving position. A pressure sensitive switch 15 is mounted in the base of the seat, for actuation by the plate 9. Upon movement downwardly of the plate 9, the switch 15 is opened; upon movement of the driver from the driving position, the switch 15 is closed.

The pressure sensitive switch 15 is in an auxiliary circuit connected to the automobile battery 16, and including conductors 17, 18, the horn 19, conductor 20, pressure sensitive switch 21, and conductor 22.

The parking brake 23 is the foot operated type and includes the foot pedal 24. The brake is pivotally mounted at 25, and the end thereof opposite the foot pedal is pivotally connected to rod 26 which is a link to the parking brake (not shown).

The switch 21 is positioned to be operated by the brake 23, when the brake is in the on position. This on position is indicated in phantom in the drawing. With the brake in the on position, the switch 21 is opened, so that the auxiliary circuit is opened, and, accordingly, the signal means in the form of the horn 19 will not operate, regardless of movement of the driver to and from the driving position.

If, however, the brake is in the off position, then the switch 21 will be closed, and the auxiliary circuit will be operative to sound the horn 19 should the driver move from the driving position, leaving the brake in the off position, since upon such movement, the switch 15 will close, thus closing the auxiliary circuit and actuating the horn 19 (the double pole switch 30, shortly to be described, is normally closed).

Whenever the driver is in the driving position, the switch 15 will be opened, and, accordingly, the auxiliary circuit of the alarm system will be in the inoperative condition.

The vehicle electrical system (not shown) including ignition system, containing a conventional ignition switch, and possibly other elements such as lights, etc., is connected to the battery 16 by the conductors 29. The vehicle electrical system is coupled to the auxiliary circuit of the parking brake alarm system, by the double pole, single throw switch 30. When the driver desires to leave the vehicle and to leave the parking brake off, as when the vehicle is to be passed through a car washing device with the driver absent from the vehicle, the switch 30 can be operated to open the auxiliary system. This will simultaneously open the vehicle circuit which includes the conductors 29. When it is desired to again operate the vehicle, the vehicle circuit must be first actuated, so that the switch 30 must be closed. This will simultaneously reactivate the auxiliary circuit for the alarm system. Thus, the double pole single throw switch 30 comprises a disconnect means for the parking brake alarm system which serves to safeguard against the possibility that the operator, after deactivating the auxiliary circuit, will forget to close the circuit before again operating the vehicle.

Figure 2:
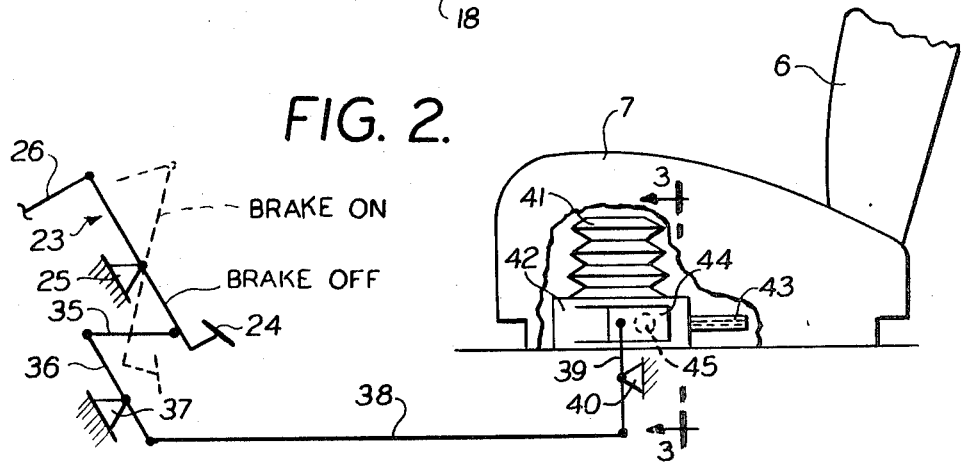
FIG. 2 is a schematic representation of an embodiment of the invention, wherein the system is mechanical.
Figure 3:
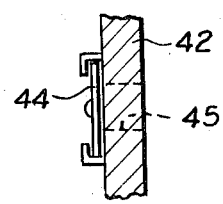
FIG. 3 is a cross-sectional view taken along line 3—3 in FIG. 2.

In the embodiment shown in FIG. 2, the system operates mechanically. The brake 23 is of a construction such as that for the system shown in FIG. 1. The brake is mechanically interconnected with elements disposed in the seat by the links 35, 36, 38, and 39. The link 35 is pivotally connected to the brake 23 at one end thereof, and the joining ends of the links are pivotally connected; the links 36 and 39 are pivotally mounted, respectively, on the fulcrums 37 and 40. In the seat 7, is mounted the bellows 41 which is operatively connected with the wind box 42. A whistle 43 is operatively connected to the wind box 42. A sliding door 44 is mounted on the wind box, and is movable between a position (shown in the drawing) wherein it covers, therefore seals, the opening 45 in the wind box, and a second position wherein the plate is shifted from the first position to expose the opening 45 to communicate the wind box with the ambient atmosphere.

With the door 44 sealing the opening 45, the drawing in of air by expansion of the bellows 41, will draw air through the whistle 43, causing the whistle to operate and issue an audible signal. Upon such expansion of the bellows, with the door 44 in a position such that the opening 45 is exposed, sufficient air will be drawn through the opening 45 so that the whistle 43 will not issue an audible signal.

The position of the door 44 is controlled by the linkage to the brake, including the link 39. When the brake is in the off position, the door 44 will seal the opening 45, so that, upon the expansion of the bellows 41, a signal will be issued. When the brake is in the on position (indicated in phantom), however, the linkage will operate to move the door 44 so as to expose the opening 45, rendering the whistle 43 inoperative.

Thus, with the brake in the off position (door 44 in closed position), should the driver move from the driving position, the bellows 41 will expand, air will be drawn through the whistle 43, and an audible signal will be issued. If, however, the brake is on when the driver moves from the driving position, then no signal will be issued, since the door 44 will be a position exposing the opening 45, making the whistle inoperative.

In a modification of the embodiment of FIG. 1, the alarm means can be such that it operates, upon being actuated, for but a limited time, e.g. a few seconds. In such an embodiment a double pole switch, e.g. switch 30 would not be required. In FIG. 1, the horn may be the automobile horn 19 and, unless suitable provision is made for modifying its operation, the alarm signal would be continuous. In the embodiment of FIG. 2, the alarm sounds for but a short time interval and then a disconnect means (which in FIG. 1 is the switch 30) is not, as a practical matter required.

What is claimed is:

1. In a vehicle comprising a brake, and a vehicle electrical circuit including an ignition system containing an ignition switch, an auxiliary electrical circuit connected in parallel with the vehicle electrical circuit, and comprising an electrically operated alarm means, a weight responsive switch responsive to movement of the driver to and from the driving position for opening when the driver moves to the driving position and closing when the driver moves from the driving position, an interrupt switch responsive to movement of the brake to the on and off positions to open and make the alarm means inoperative when the brake is in the on position and to close and make the alarm means operative when the brake is in the off position, and switch means for selectively and simultaneously opening and closing the vehicle circuit and the auxiliary circuit.

* * * * *